United States Patent [19]

Confer

[11] Patent Number: 4,588,853

[45] Date of Patent: May 13, 1986

[54] ELECTRICAL TRENCH GROMMET MEMBER

[75] Inventor: Merle A. Confer, Ayer, Mass.

[73] Assignee: Roll Form Products, Inc., Boston, Mass.

[21] Appl. No.: 622,776

[22] Filed: Jun. 21, 1984

[51] Int. Cl.$^4$ .............................................. H02G 3/28
[52] U.S. Cl. .......................................... 174/48; 16/2; 403/388
[58] Field of Search ............ 174/48, 49, 65 G, 153 G; 52/220, 221; 16/2; 403/408, 388

[56] References Cited

U.S. PATENT DOCUMENTS

| | | | |
|---|---|---|---|
| 2,709,290 | 5/1955 | Rosenthal | 174/153 G X |
| 2,836,214 | 5/1958 | Rapata | 174/153 G X |
| 3,308,417 | 3/1967 | Hammell et al. | 174/153 G X |
| 3,721,051 | 3/1973 | Fork | 174/49 X |
| 3,887,960 | 6/1975 | Sherman | 16/2 |

Primary Examiner—Arthur T. Grimley
Assistant Examiner—D. A. Tone
Attorney, Agent, or Firm—Wolf, Greenfield & Sacks

[57] ABSTRACT

An electrical trench grommet member for coupling between a corrugated metal decking having alternating crests and troughs and an electrical trench adapted to extend transversely of the decking and troughs. The decking has a hole in a crest thereof through which electrical wiring extends and the electrical trench also has a hole in the bottom wall thereof, which is preferably rectangular and larger than the decking hole. The grommet member in accordance with the invention has a grommet piece adapted to interlock with the decking hole and of comparable size to the decking hole to engage therewith and also includes an overlay piece integral with the grommet piece and extending peripherally therefrom to cover the larger trench hole.

12 Claims, 5 Drawing Figures

4,588,853

ELECTRICAL TRENCH GROMMET MEMBER

BACKGROUND OF THE INVENTION

The present invention relates in general to a grommet member. More particularly, the invention relates to a grommet member that is adapted for use with corrugated metal decking and an associated electrical trench which carries electrical wiring for coupling to the metal decking cells. The grommet member of the present invention is in particular, adapted to simplify the coupling of electrical wiring as will be defined in more detail hereinafter.

Reference may now be made to the perspective view of FIG. 1 which illustrates the present technique for providing coupling passages between the metal decking 10 and an electrical trench 12. FIG. 1 also illustrates the problems that are associated with the providing of these coupling passageways. FIG. 1 also illustrates the standard grommet 14 that is employed to provide a passageway from the electrical trench 12 into a cell 16 in the metal decking. The grommet 14 is used for preventing any jagged edges associated with the metal from interfering with electrical wiring that passes into the cell 16 from the electrical trench 12.

Typically, the metal decking 10, which is of corrugated form, including crest walls 18, trough walls 20, and web 22, is provided with one or more holes such as the hole 24 illustrated in FIG. 1 in the top crest wall 18. These holes 24 are typically centrally disposed between the corresponding web sides.

The electrical trench 12 is also provided with similarly sized holes 26. These holes 26 are pre-punched. The electrical trench 12 is typically quite long and extends over a great number of corrugations of the metal decking. What occurs very typically is that the holes in the electrical trench 12 become out of registry for one reason or another with the holes in the metal decking. This may occur because of some slight mistake in punching the holes, or because of other inaccuracies, either associated with the manufacture of the product or associated with the installation thereof. In FIG. 1, at the left trough wall 18, this misalignment or misregistration is illustrated in which the underlying hole 24 in the corrugated metal decking is out-of-alignment with the hole 26 in the electrical trench 12. This problem is remedied at the present time by at least partially patching the hole 26 as illustrated by the patch 28 illustrated in phantom outline in the rightmost section of the electrical trench illustrated in FIG. 1. It is also necessary to re-punch the hole 26 so that it is in proper alignment with the underlying hole 24 in the metal decking. Actually, this subsequent punching or drilling is more easily accomplished when the holes are more off-center, but in either case, where there is any misalignment, problems occur, and much time and effort has to go into correcting the matter. As indicated previously, this requires, at the very least, a patching of the improperly positioned hole 26 and then a subsequent drilling or punching operation so as to locate the hole 26 in the proper position relative to the underlying hole 24 in the corrugated metal decking. This means that additional time and expense has to be used in correcting this misalignment problem before the grommet 14 can even be used in the hole. The patching may well require the use of some type of welding equipment and when the misalignment is only slight, this may also require the use of other cutting tools other than simply a drill. This additional work is not only time consuming, but is also very labor intensive, thus significantly adding to the cost of installing decking and associated trench of this type.

Accordingly, it is an object of the present invention to overcome the aforementioned problems associated with alignment of the decking and overlying electrical trench.

A further object of the present invention is to provide an improved electrical trench grommet member that is used so as to greatly simplify the forming of a grommeted hole or passageway to enable electrical wiring coupling between an electrical trench and cells of a corrugated metal decking which is comprised of alternating crests and troughs forming such cells.

SUMMARY OF THE INVENTION

To accomplish the foregoing and other objects, features and advantages of the invention, there is provided an improved grommet member. This grommet member is used in connection with an electrical trench which in turn is associated with a corrugated metal decking. The metal decking has alternate crests and troughs and the electrical trench is adapted to extend transversely of the decking crests and troughs essentially resting upon the top crest walls. The decking is provided with a hole in the crest thereof through which electrical wiring is adapted to extend inside of a cell that is in substance defined by the crest and adjacent side webs interconnecting from the crest wall to lower disposed trough walls. The electrical trench also has a hole in the bottom wall thereof, which is adapted to overlie the aforementioned hole in the decking. In order to enable immediate alignment between these holes, the hole in the electrical trench is made larger than the decking hole and is adapted to have the trench hole periphery overlay and essentially overlap the decking hole. In a preferred embodiment of the invention, as described herein, the trench hole is rectangular and has a length at least twice that of the diameter of a round hole provided in the decking thereunder. The grommet member is adapted to engage substantially only with the round hole in the decking. In this regard, the grommet member has a grommet piece adapted to interlock with the decking hole and of comparable size to the decking hole to engage therewith. The grommet member also has an overlay piece integral with the grommet piece and extending peripherally therefrom to cover the larger trench hole. In the previous preferred example, wherein the trench hole is rectangular, it is noted that the overlay piece is also rectangular and is substantially larger than the electrical trench rectangular hole so that should misalignment occur, the grommet may be moved to engage with the decking hole and yet still sufficiently have the overlay piece portion thereof overlying the rectangular hole in the electrical trench. Thus, in this way it is noted that there is no patching required of the electrical trench nor is there any requirement for redrilling or repunching of the holes in the electrical trench. Any misalignment is essentially compensated for by virtue of the larger size hole in the electrical trench in combination with the increased size of the overlay portion of the grommet member.

BRIEF DESCRIPTION OF THE DRAWINGS

Numerous other objects, features and advantages of the invention should now become apparent upon a reading of the following detailed description taken in conjunction with the accompanying drawing, in which.

DETAILED DESCRIPTION

Figure 1:
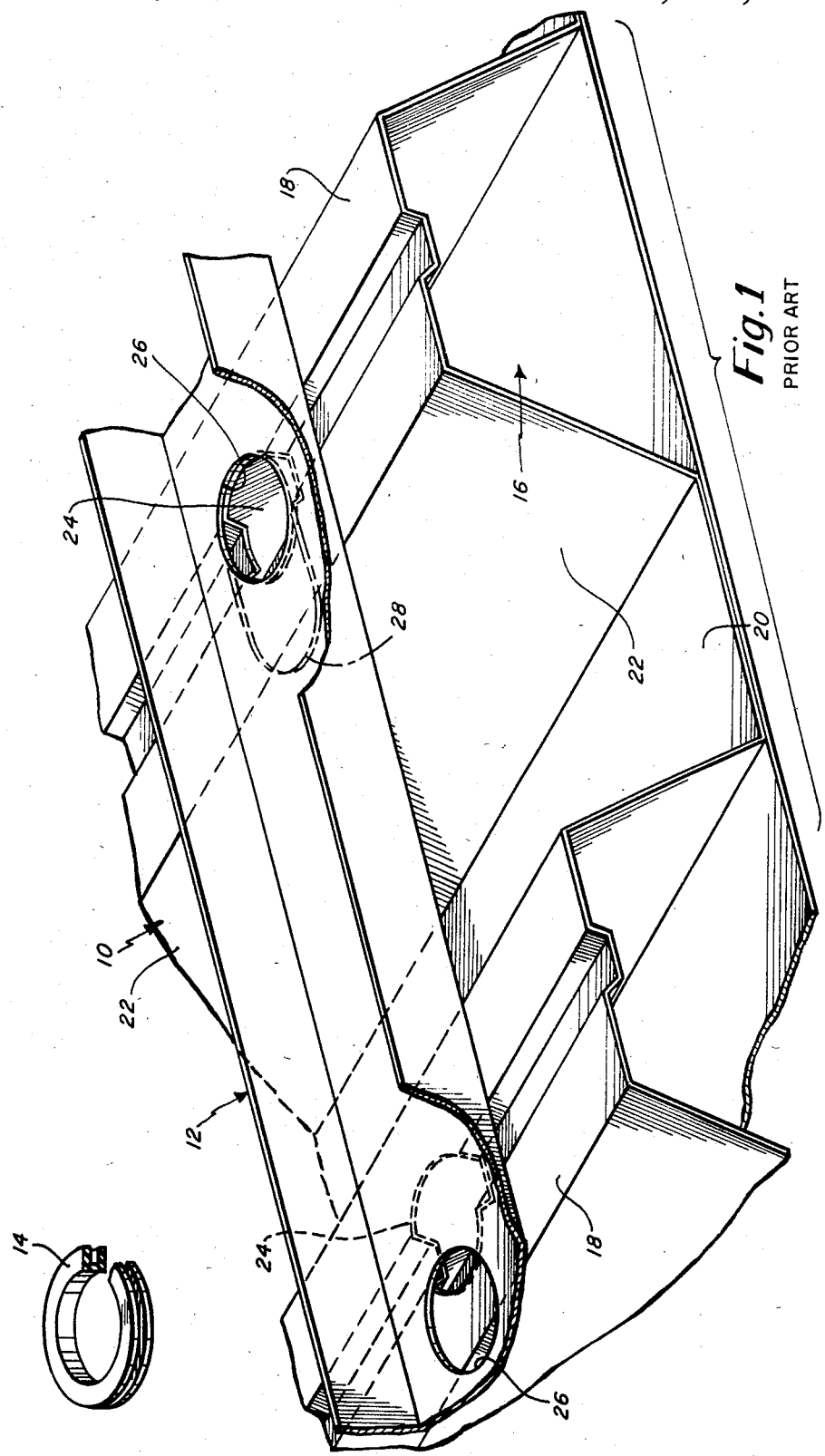
FIG. 1 is a perspective view illustrating a prior art construction and furthermore illustrating the problems associated therewith with regard to misalignment between coupling holes of the electrical trench and corrugated metal decking.

Referring now to the drawings, and in particular in connection with FIG. 1, it is noted that this is a prior art drawing that has been discussed in detail hereinbefore. This prior art drawing illustrates the problems associated with the prior art technique of providing coupling holes from an electrical trench to cells of a corrugated metal decking. FIGS. 2-5 illustrate the principles of the present invention.

Figure 2:
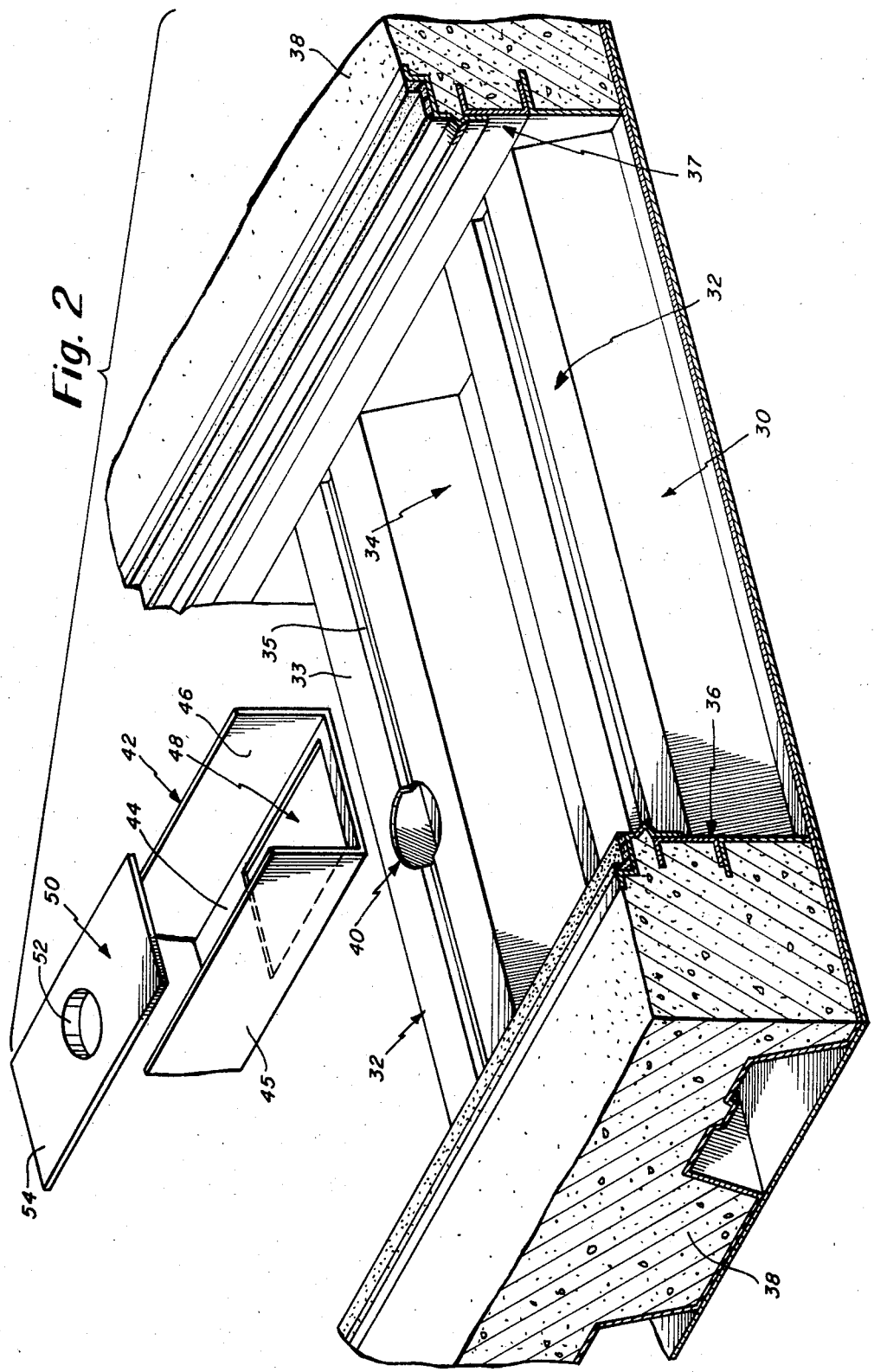
FIG. 2 is a perspective view illustrating the electrical trench grommet member of the present invention in a partially exploded view.
Figure 3:
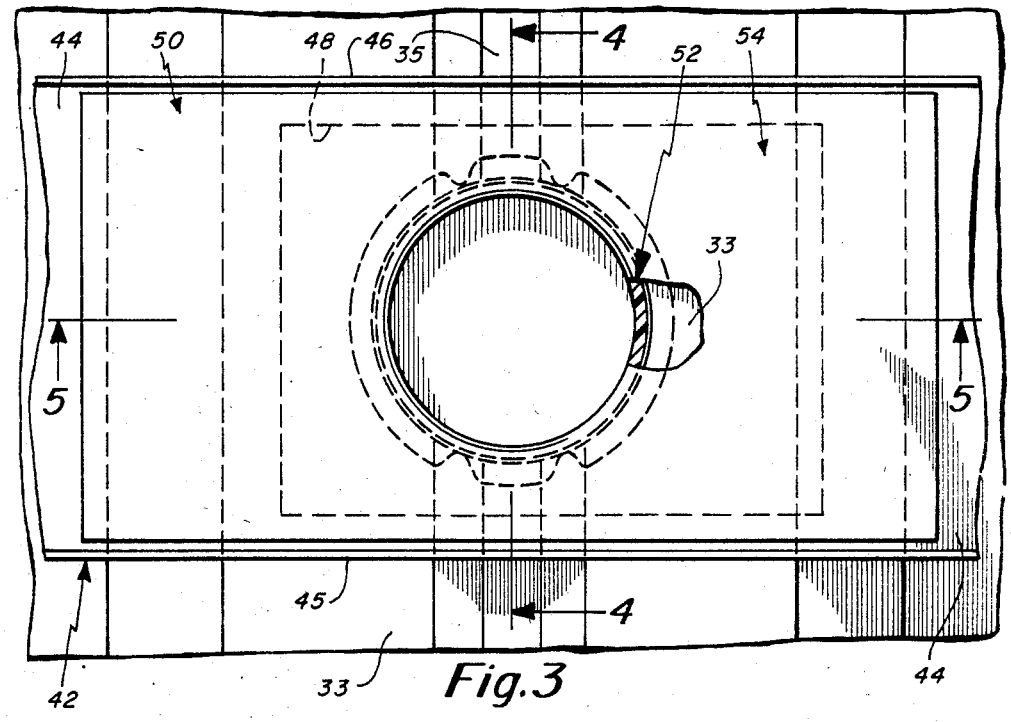
FIG. 3 is a plan view in the area of the coupling hole showing the grommet member in position.
Figure 4:
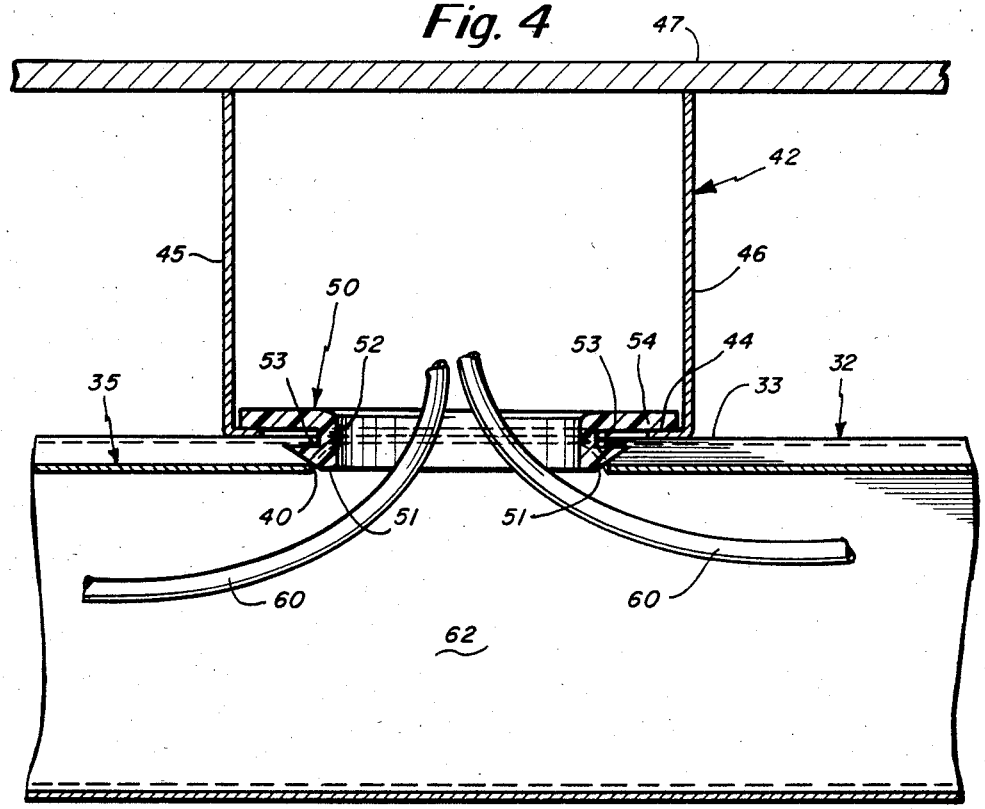
FIG. 4 is a cross-sectional view taken along line 4—4 of FIG. 3 showing the grommet member in place relative to the corrugated metal decking.
Figure 5:
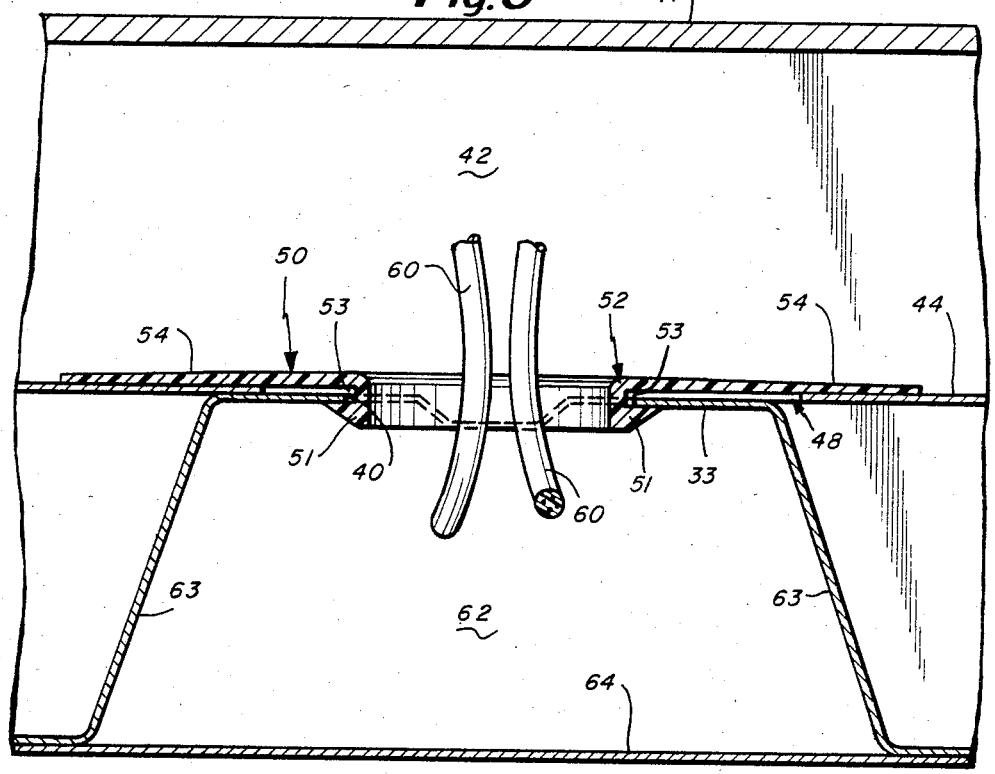
FIG. 5 is a further cross-sectional view as taken along line 5—5 of FIG. 3.

In FIG. 2 and also in the details of FIGS. 3-5, there is illustrated a corrugated metal decking 30 which is comprised of alternating crests 32 and troughs 34. As illustrated in FIG. 2, there is also a trench construction defined by side rails 36 and 37. FIG. 2 also shows the poured concrete 38 that is poured over the corrugated flooring and up to the rails 36 and 37. The construction of the rails 36 and 37 is not described in any detail herein, as the invention is not directed to these rails, per se.

FIG. 2 shows one of the electrical conduit holes 40 in a top crest wall 33. This wall 33 is shown having an elongated rib 35. However, it is understood that the wall 33 may also be totally flat. As a matter of fact, in connection with the use of a grommet member associated with the hole 40, it may be preferred to have the top wall 33 totally flat.

FIG. 2 also illustrates the electrical trench 42 which is of U-shape cross section, including a bottom wall 44 and upright side walls 45 and 46. It is noted that there is provided a rectangular hole 48 in the bottom wall 44. FIG. 2 also illustrates the grommet member 50 of the present invention which may be considered as being comprised of basically two pieces including a centrally disposed grommet piece 52, and an overlay piece 54. FIG. 2 shows the electrical trench 42 and the grommet member 50 in an exploded position. Reference may now be made to FIGS. 2-5 which show further details of the grommet member in particular, and also illustrating the parts in position.

FIG. 3 is a plan view illustrating the grommet member 50 with its parts comprising a grommet piece 52 integral with an overlay piece 54. It is noted that the overlay piece 54 is rectangular and has a width that is comparable to the spacing between the walls 45 and 46. The length of the overlay piece 54 from end-to-end, as noted in FIG. 3, extends well beyond the end points of the rectangular opening 48. The rectangular opening 48 is shown in FIG. 3 in dotted outline. FIG. 3 also has a portion thereof illustrated with the grommet member 50 cut away to illustrate a cross-section through the grommet piece portion of the grommet member. FIG. 3 also illustrates the out-of-alignment condition that can exist without causing a problem such as illustrated in the prior art construction of FIG. 1. In this regard, it is noted that the rectangular hole 48 is not perfectly centered with the hole 40. However, the grommet is engageable with the hole 40 and the overlay piece 54 of the grommet member extends sufficiently so as to easily cover the rectangular hole 48. In this connection, reference will also be made hereinafter to FIG. 5.

FIG. 4 is a cross-setional view taken along line 4—4 of FIG. 3 illustrating the trench 42 with its bottom wall 44 resting upon the corrugated metal flooring and in particulr, upon the top wall 33 of the crest 32. FIG. 4 also illustrates a cover 47 that is supported at the top of the walls 45 and 46. The cover typically extends to the rails 36 and 37 illustrated in FIG. 2. The electrical trench 42 may be secured to the corrugated metal flooring in a well-known manner. This securing may be carried out by welding, riveting or other means of securing. FIG. 4 shows the grommet member 50 including its centrally disposed grommet piece 52 integrally formed with the overlay piece 54. The grommet piece 52 has a lower disposed annular flange 51 which defines with the overlay piece 54, an annular channel 53. The channel 53 is adapted to mate with the hole 40 and thus the diameter of the channel is comparable to the diameter of the hole 40. The diameter of the hole 40 may be slightly larger so as to enable them to easily insert the grommet into the hole 40. As illustrated in FIG. 4, it is noted that the outer periphery of the overlay piece 54 rests upon the bottom wall 44. FIG. 4 also shows electrical conduits 60 which extend through the grommet member 50 to enable electrical wiring coupling from the trench 42 to the corrugated metal decking cell 62.

FIG. 5 also shows the electrical wiring 60 extending through the grommet interconnecting from the electrical trench to the cell 62. It is noted that the cell 62 is defined by the crest wall 33 and also by side webs 63 along with a floor 64 of the metal decking. FIG. 5 also illustrates the annular flange 51 defining the annular channel 53 received by the hole 40 in the corrugated metal decking at the crest wall 33. FIG. 5 also clearly illustrates a cross-sectional view of the elongated dimension of the overlay piece 54 of the grommet member. It is noted that the overlay piece 54 tapers from a thicker portion adjacent to the grommet piece 52 to a thinner portion at the periphery of the overlay piece 54. This tapering is advantageous so as to minimize the thickness of the outer edge. In this way, it is more difficult for one to catch something under the overlay piece of the grommet member.

FIG. 5 also illustrates the adjustable feature of the present invention. Again, the rectangular hole 48 does not perfectly centrally align with the hole 40 and in fact in FIG. 5, it can be seen that the rectangular hole 48 extends to the right actually beyond the top crest wall 33. However, as also illustrated in FIG. 5, the grommet member extends over the rectangular hole 48 and thus provides a seal between the electrical trench 42 and the corrugated decking.

Having described one embodiment of the present invention, it should now be apparent to those skilled in the art that numerous other embodiments are contemplated as falling within the scope of this invention.

What is claimed is:

1. An electrical trench grommet member in combination with and coupling between a corrugated metal decking having alternating crests and troughs and an electrical trench adapted to extend transversely of the decking crests and troughs, said decking having a hole in a crest thereof, said electrical trench having a hole in the bottom wall thereof larger than the decking hole and adapted to have the trench hole periphery overlay the decking hole, said grommet member having a grommet piece adapted to interlock with the decking hole and of comparable size to the decking hole to engage therewith, and an overlay piece integral with said grommet piece and extending peripherally therefrom to cover the larger trench hole.

2. The combination as set forth in claim 1 wherein said grommet piece and overlay piece are integrally formed.

3. The combination as set forth in claim 2 wherein said grommet member is constructed of a resilient rubber-like material.

4. The combination as set forth in claim 1 wherein said grommet piece is circular having a circular grommet opening and a lower annular flange defining an annular grommet channel engageable with the decking hole which is also of circular shape.

5. The combination as set forth in claim 4 wherein the upper end of said grommet member radially extends to form said overlay piece.

6. The combination as set forth in claim 5 wherein said overlay piece has multiple linear sides.

7. The combination as set forth in claim 6 wherein said overlay piece is four sided.

8. The combination as set forth in claim 7 wherein said overlay piece is rectangular.

9. The combination as set forth in claim 1 wherein said grommet piece is circular defining a circular grommet opening.

10. The combination as set forth in claim 9 wherein said overlay piece has multiple linear sides.

11. The combination as set forth in claim 10 wherein the trench hole is rectangular and has an area less than the area of the grommet member including the overlay piece.

12. A method of aligning an electrical trench grommet member between a corrugated metal decking having alternating crescents and troughs and an electrical trench adapted to extend transversely of the decking crescents and troughs, said method comprising the steps of providing a hole in a crest of the decking through which electrical wiring may extend, providing a hole in a bottom wall of the electrical trench larger in size than the decking hole and adapted to have the trench hole periphery overlay the decking hole, providing a grommet member, interlocking the grommet member with the decking hole, the grommet member being of comparable size to the decking hole to engage therewith, and positioning the grommet member so that portions thereof extend peripherally to cover the larger trench hole.

* * * * *